US012803936B1

(12) United States Patent
Raimbault

(10) Patent No.: US 12,803,936 B1
(45) Date of Patent: Nov. 17, 2026

(54) SYSTEM, METHOD, AND COMPUTER PROGRAM PRODUCT FOR SINGLE THREAD MESSAGING USING EPISODIC

(71) Applicant: Mistral AI SAS, Paris (FR)

(72) Inventor: Octave Raimbault, Paris (FR)

(73) Assignee: Mistral AI SAS, Paris (FR)

( * ) Notice: Subject to any disclaimer, the term of this patent is extended or adjusted under 35 U.S.C. 154(b) by 0 days.

(21) Appl. No.: 19/550,841

(22) Filed: Feb. 26, 2026

(51) Int. Cl.
*H04L 51/02* (2022.01)
*H04L 51/216* (2022.01)

(52) U.S. Cl.
CPC ............ *H04L 51/02* (2013.01); *H04L 51/216* (2022.05)

(58) Field of Classification Search
CPC .............................. H04L 51/02; H04L 51/216
USPC .......................................................... 709/206
See application file for complete search history.

(56) References Cited

U.S. PATENT DOCUMENTS 12,524,452 B1 * 1/2026 Kranjc ................ G06F 16/3349
2017/0019356 A1 * 1/2017 Gilbert ................. G06Q 30/016
2025/0103625 A1 * 3/2025 Addanki ............. G06F 16/3329
2025/0371449 A1 * 12/2025 Thompson, III ....... G06N 3/006
2026/0064945 A1 * 3/2026 Wang .................... G06F 40/166
2026/0080099 A1 * 3/2026 Bhavani .............. G06F 21/6254
2026/0087456 A1 * 3/2026 Yoo ..................... G06F 16/3323

* cited by examiner

*Primary Examiner* — Ruolei Zong
(74) *Attorney, Agent, or Firm* — The Webb Law Firm

(57) ABSTRACT

Provided are systems, methods, and computer program products for single thread messaging using episodic memory. The system includes at least one server computer configured to generate at least one response to at least one user query input into a dialog window displayed on a user device, determine a chatbot episode has ended based on a new user query input into the dialog window, store the plurality of messages in episodic memory for the chatbot episode, search episodic memory for a plurality of previous chatbot episodes to identify at least one previous chatbot episode based on the new user query, extract messages from the at least one previous chatbot episode, and generate, with the machine-learning model, a response to the new user query based on inputting the extracted messages into a context window of the machine-learning model.

20 Claims, 7 Drawing Sheets

Episode 2
12/22 17:24 - 12/22 17:31

Tags (8)
job-application email-writing software-engineering ai-artificial-intelligence machine-learning career-development tech-industry Professional-communication Situation
User needed to draft a professional email applying for a Software Engineer position at AI Innovations, aiming to highlight their MIT background and machine learning project on sign language interpretation effectively.

Lessons learned
- User is a software engineer with specialized experience in machine learning applications, specifically mentioning a sign language interpretation project.
- User has an academic background from MIT, which they consider relevant to highlight for professional opportunities.
- User is targeting positions at AI-focused companies, demonstrating a clear interest in artificial intelligence as a career field.
- User prefers professional communication assistance that maintains a formal tone suitable for job applications.
- User values concise yet impactful presentation of their qualifications, as evidenced by mentioning both education and project experience upfront.

Outcomes
Assistant provided a concise, tailored email draft emphasizing the user's relevant qualifications, project experience, and alignment with the company's AI focus. User received a ready-to-use template with clear placeholders for personalization and guidance on key elements to include.

FIG. 4

Episode 3
12/22 17:31 - 12/23 10:35

Tags (8)
Javascript debugging function-refactoring code-review pricing-calculation discount-logic programming-best-practices variable-naming Situation
User was debugging a JavaScript function that calculates discounted prices but encountered unexpected Infinity return values and needed help understanding the root cause while also improving code readability with more descriptive variable names.

Lessons learned
-User prefers explicit, self-documenting variable names over generic ones (e.g., prefers basePrice, quantity, discountRate over a, b, c).
-User is debugging mathematical operations that result in unexpected outputs (e.g., Infinity) and seeks explanations for edge cases.
-User works with pricing/discount calculations and values clarity in financial logic to avoid errors.
-User appreciates immediate acknowledgment of concerns (e.g., "Good catch!") before receiving solutions.
-User provides contextual domain information (e.g., "calculates a price with an optional discount rate") when generic code lacks clarity.

Outcomes
Assistant identified that division by zero (when discountRate = 0) caused the Infinity result and provided a corrected function with explicit variable names (basePrice, quantity, discountRate instead of a, b, c). User received both the technical fix and a clarification request about whether discountRate should be a divisor (e.g., 0.9 for 10% off) or a percentage (e.g., 10).

FIG. 5

Episode 26
12/23 10:49 - Ongoing
Tags (8)
crm-development nextjs typescript web-development project-planning
software-architecture database-design fullstack-development Situation
User wanted to build a custom CRM from scratch using Next.js and TypeScript but felt overwhelmed by the technical decisions and needed a structured starting point with clear priorities and stack recommendations.

Lessons learned
-User is considering building a custom CRM solution from scratch rather than using existing platforms, indicating a preference for tailored solutions and potentially having specific requirements not met by off-the-shelf options.
-User prefers working with Next.js and TypeScript for development projects, suggesting familiarity and comfort with these technologies.
-User expressed feeling overwhelmed by decision-making in complex projects, indicating they may benefit from structured guidance, prioritized steps, or decision frameworks when approaching large tasks.

Outcomes
Assistant provided a prioritized 4-step roadmap with MVP feature scope (contacts, deals, auth, search), opinionated tech stack recommendations (Prisma, ShadCN, NextAuth.js), and immediate first steps including project scaffolding and data modeling. User received clear guidance to begin with one CRUD flow while avoiding premature optimization, but no confirmation of implementation was received.

FIG. 6

SYSTEM, METHOD, AND COMPUTER PROGRAM PRODUCT FOR SINGLE THREAD MESSAGING USING EPISODIC

BACKGROUND

1. Field

This disclosure relates generally to machine-learning and, in some non-limiting embodiments or aspects, systems, methods, and computer program products for single thread messaging using episodic memory.

2. Technical Considerations

Existing chatbot interfaces include chat histories listed on a side of a primary chatbot graphical user interface (GUI). These historic chats are not often used and continually accumulate in a manner that clutters the GUI. If a user wishes to revisit an old chat history, it is often difficult and cumbersome for the user to locate the chat from a long list, leading users to initiate a new chatbot interaction that lacks historic context and expends resources by generating content that was already fully or partially generated in a historic chat. Initiating a new chatbot interaction uses recent context from previous interactions, even if such interactions are unrelated to the new interaction, due to limitations on the size (e.g., number of tokens) of the context window.

SUMMARY

According to non-limiting embodiments or aspects, provided is a method comprising: generating, with at least one computing device and a machine-learning model, at least one response to at least one user query input into a dialog window displayed on a user device; determining, with at least one computing device, a chatbot episode has ended based on a new user query input into the dialog window, the chatbot episode comprising a plurality of messages including the at least one response and the at least one user query; storing, with at least one computing device, the plurality of messages in episodic memory for the chatbot episode; searching, with at least one computing device and based on the new user query, episodic memory for a plurality of previous chatbot episodes to identify at least one previous chatbot episode; extracting, with at least one computing device, messages from the at least one previous chatbot episode; and generating, with the machine-learning model, a response to the new user query based on inputting the extracted messages into a context window of the machine-learning model.

In non-limiting embodiments or aspects, the dialog window is independent of a primary chat dialog interface configured to conduct an automated chatbot dialog with the user with the machine-learning model, and the plurality of messages does not appear in the primary chat dialog interface. In non-limiting embodiments or aspects, wherein determining the chatbot episode has ended comprises: determining a distance between the new user query and at least one message of the plurality of messages based on comparing the new user query to the at least one message; and determining the distance satisfies a threshold, the chatbot episode is determined to have ended in response to the distance satisfying the threshold. In non-limiting embodiments or aspects, the method further comprises: generating, with at least one computing device, a summary of the chatbot episode based on the plurality of messages, the summary is stored with the episodic memory for the chatbot episode. In non-limiting embodiments or aspects, the method further comprises: generating at least one embedding based on at least one of the summary and the plurality of messages, the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode. In non-limiting embodiments or aspects, the at least one previous chatbot episode is identified in response to determining that a distance between the at least one embedding and the embedding of the summary for the at least one previous chatbot episode satisfies a threshold. In non-limiting embodiments or aspects, wherein generating the summary comprises inputting at least a portion of the plurality of messages into a language model. In non-limiting embodiments or aspects, the method further comprises: generating at least one tag for the chatbot episode, the at least one tag is stored with the episodic memory for the chatbot episode. In non-limiting embodiments or aspects, the method further comprises: automatically displaying the dialog window on a current desktop of the user device in response to a user shortcut action.

According to non-limiting embodiments or aspects, provided is a system comprising: at least one server computer comprising at least one processor, the at least one server computer configured to: generate with a machine-learning model, at least one response to at least one user query input into a dialog window displayed on a user device; determine a chatbot episode has ended based on a new user query input into the dialog window, the chatbot episode comprising a plurality of messages including the at least one response and the at least one user query; store the plurality of messages in episodic memory for the chatbot episode; search episodic memory for a plurality of previous chatbot episodes to identify at least one previous chatbot episode based on the new user query; extract messages from the at least one previous chatbot episode; and generate, with the machine-learning model, a response to the new user query based on inputting the extracted messages into a context window of the machine-learning model.

In non-limiting embodiments or aspects, the dialog window is independent of a primary chat dialog interface configured to conduct an automated chatbot dialog with the user with the machine-learning model, and the plurality of messages does not appear in the primary chat dialog interface. In non-limiting embodiments or aspects, wherein determining the chatbot episode has ended comprises: determining a distance between the new user query and at least one message of the plurality of messages based on comparing the new user query to the at least one message; and determining the distance satisfies a threshold, the chatbot episode is determined to have ended in response to the distance satisfying the threshold. In non-limiting embodiments or aspects, the at least one server computer is further configured to: generate a summary of the chatbot episode based on the plurality of messages, the summary is stored with the episodic memory for the chatbot episode. In non-limiting embodiments or aspects, the at least one server computer is further configured to: generate at least one embedding based on at least one of the summary and the plurality of messages, the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode. In non-limiting embodiments or aspects, the at least one previous chatbot episode is identified in response to determining that a distance between the at least one embedding and the embedding of the summary for the at least one previous chatbot episode satisfies a threshold. In non-limiting embodiments or aspects, wherein generating the summary comprises inputting at least a portion of the plurality of messages into a language model. In non-limiting embodiments or aspects, the at least one server computer is further configured to: generate at least one tag for the chatbot episode, the at least one tag is stored with the episodic memory for the chatbot episode. In non-limiting embodiments or aspects, the at least one server computer is further configured to: automatically display the dialog window on a current desktop of the user device in response to a user shortcut action.

According to non-limiting embodiments or aspects, provided is a computer program product comprising at least one non-transitory computer-readable medium including program instructions that, when executed by at least one computing device, cause the at least one computing device to: generate with a machine-learning model, at least one response to at least one user query input into a dialog window displayed on a user device; determine a chatbot episode has ended based on a new user query input into the dialog window, the chatbot episode comprising a plurality of messages including the at least one response and the at least one user query; store the plurality of messages in episodic memory for the chatbot episode; search episodic memory for a plurality of previous chatbot episodes to identify at least one previous chatbot episode based on the new user query; extract messages from the at least one previous chatbot episode; and generate, with the machine-learning model, a response to the new user query based on inputting the extracted messages into a context window of the machine-learning model. In non-limiting embodiments or aspects, the dialog window is independent of a primary chat dialog interface configured to conduct an automated chatbot dialog with the user with the machine-learning model, and the plurality of messages does not appear in the primary chat dialog interface.

Further non-limiting embodiments and aspects are provided in the following clauses:

Clause 1: A method comprising: generating, with at least one computing device and a machine-learning model, at least one response to at least one user query input into a dialog window displayed on a user device; determining, with at least one computing device, a chatbot episode has ended based on a new user query input into the dialog window, the chatbot episode comprising a plurality of messages including the at least one response and the at least one user query; storing, with at least one computing device, the plurality of messages in episodic memory for the chatbot episode; searching, with at least one computing device and based on the new user query, episodic memory for a plurality of previous chatbot episodes to identify at least one previous chatbot episode; extracting, with at least one computing device, messages from the at least one previous chatbot episode; and generating, with the machine-learning model, a response to the new user query based on inputting the extracted messages into a context window of the machine-learning model.

Clause 2: The method of clause 1, wherein the dialog window is independent of a primary chat dialog interface configured to conduct an automated chatbot dialog with the user with the machine-learning model, and wherein the plurality of messages does not appear in the primary chat dialog interface.

Clause 3: The method of any of clauses 1-2, wherein determining the chatbot episode has ended comprises: determining a distance between the new user query and at least one message of the plurality of messages based on comparing the new user query to the at least one message; and determining the distance satisfies a threshold, wherein the chatbot episode is determined to have ended in response to the distance satisfying the threshold.

Clause 4: The method of any of clauses 1-3, further comprising: generating, with at least one computing device, a summary of the chatbot episode based on the plurality of messages, wherein the summary is stored with the episodic memory for the chatbot episode.

Clause 5: The method of any of clauses 1-4, further comprising: generating at least one embedding based on at least one of the summary and the plurality of messages, wherein the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode.

Clause 6: The method of any of clauses 1-5, wherein the at least one previous chatbot episode is identified in response to determining that a distance between the at least one embedding and the embedding of the summary for the at least one previous chatbot episode satisfies a threshold.

Clause 7: The method of any of clauses 1-6, wherein generating the summary comprises inputting at least a portion of the plurality of messages into a language model.

Clause 8: The method of any of clauses 1-7, further comprising: generating at least one tag for the chatbot episode, wherein the at least one tag is stored with the episodic memory for the chatbot episode.

Clause 9: The method of any of clauses 1-8, further comprising: automatically displaying the dialog window on a current desktop of the user device in response to a user shortcut action.

Clause 10: A system comprising: at least one server computer comprising at least one processor, the at least one server computer configured to: generate with a machine-learning model, at least one response to at least one user query input into a dialog window displayed on a user device; determine a chatbot episode has ended based on a new user query input into the dialog window, the chatbot episode comprising a plurality of messages including the at least one response and the at least one user query; store the plurality of messages in episodic memory for the chatbot episode; search episodic memory for a plurality of previous chatbot episodes to identify at least one previous chatbot episode based on the new user query; extract messages from the at least one previous chatbot episode; and generate, with the machine-learning model, a response to the new user query based on inputting the extracted messages into a context window of the machine-learning model.

Clause 11: The system of clause 10, wherein the dialog window is independent of a primary chat dialog interface configured to conduct an automated chatbot dialog with the user with the machine-learning model, and wherein the plurality of messages does not appear in the primary chat dialog interface.

Clause 12: The system of any of clauses 10-11, wherein determining the chatbot episode has ended comprises: determining a distance between the new user query and at least one message of the plurality of messages based on comparing the new user query to the at least one message; and determining the distance satisfies a threshold, wherein the chatbot episode is determined to have ended in response to the distance satisfying the threshold.

Clause 13: The system of any of clauses 10-12, wherein the at least one server computer is further configured to: generate a summary of the chatbot episode based on the plurality of messages, wherein the summary is stored with the episodic memory for the chatbot episode.

Clause 14: The system of any of clauses 10-13, wherein the at least one server computer is further configured to: generate at least one embedding based on at least one of the summary and the plurality of messages, wherein the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode.

Clause 15: The system of any of clauses 10-14, wherein the at least one previous chatbot episode is identified in response to determining that a distance between the at least one embedding and the embedding of the summary for the at least one previous chatbot episode satisfies a threshold.

Clause 16: The system of any of clauses 10-15, wherein generating the summary comprises inputting at least a portion of the plurality of messages into a language model.

Clause 17: The system of any of clauses 10-16, wherein the at least one server computer is further configured to: generate at least one tag for the chatbot episode, wherein the at least one tag is stored with the episodic memory for the chatbot episode.

Clause 18: The system of any of clauses 10-17, wherein the at least one server computer is further configured to: automatically display the dialog window on a current desktop of the user device in response to a user shortcut action.

Clause 19: A computer program product comprising at least one non-transitory computer-readable medium including program instructions that, when executed by at least one computing device, cause the at least one computing device to: generate with a machine-learning model, at least one response to at least one user query input into a dialog window displayed on a user device; determine a chatbot episode has ended based on a new user query input into the dialog window, the chatbot episode comprising a plurality of messages including the at least one response and the at least one user query; store the plurality of messages in episodic memory for the chatbot episode; search episodic memory for a plurality of previous chatbot episodes to identify at least one previous chatbot episode based on the new user query; extract messages from the at least one previous chatbot episode; and generate, with the machine-learning model, a response to the new user query based on inputting the extracted messages into a context window of the machine-learning model.

Clause 20: The computer program product of clause 19, wherein the dialog window is independent of a primary chat dialog interface configured to conduct an automated chatbot dialog with the user with the machine-learning model, and wherein the plurality of messages does not appear in the primary chat dialog interface.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 4 illustrates episodic memory for a chatbot episode according to non-limiting embodiments or aspects;

FIG. 5 illustrates episodic memory for a chatbot episode according to non-limiting embodiments or aspects;

FIG. 6 illustrates episodic memory for a chatbot episode according to non-limiting embodiments or aspects.

DESCRIPTION

Figure 1:
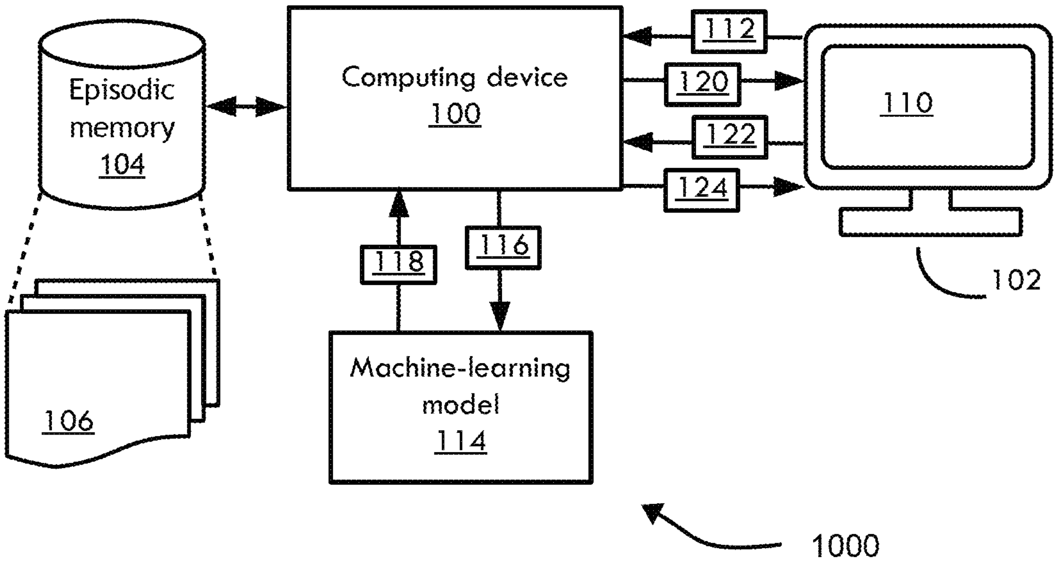
FIG. 1 illustrates a schematic diagram of a system for single thread messaging using episodic memory according to non-limiting embodiments or aspects.

For purposes of the description hereinafter, the terms “end,” “upper,” “lower,” “right,” “left,” “vertical,” “horizontal,” “top,” “bottom,” “lateral,” “longitudinal,” and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles “a” and “an” are intended to include one or more items and may be used interchangeably with “one or more” and “at least one.” Furthermore, as used herein, the term “set” is intended to include one or more items (e.g., related items, unrelated items, a combination of related and unrelated items, and/or the like) and may be used interchangeably with “one or more” or “at least one.” Where only one item is intended, the term “one” or similar language is used. Also, as used herein, the terms “has,” “have,” “having,” or the like are intended to be open-ended terms. Further, the phrase "based on" is intended to mean "based at least partially on" unless explicitly stated otherwise.

As used herein, the term "computing device" may refer to one or more devices configured to process data. A computing device may include one or more processors, such as Central Processing Units (CPUs), Graphics Processing Units (GPUs), microcontrollers, integrated circuits, field-programmable gate arrays (FPGAs), and/or the like. A computing device may, in some examples, include components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer. In some non-limiting embodiments, a computing device may include a biological or quantum processing device.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server," "a processor," or "a computing device," as used herein, may refer to a previously recited server, processor, and/or computing device that is recited as performing a previous step or function, a different server, processor, or computing device, and/or a combination of computing devices. For example, as used in the specification and the claims, a first computing device, a first server, and/or a first processor that is recited as performing a first step or function may refer to the same or different computing device, server, and/or a processor recited as performing a second step or function.

Provided herein are systems, methods, and computer program products for single thread messaging using episodic memory. Non-limiting embodiments provide for a message-based chatbot dialog between a user and an automated system controlled by one or more artificial intelligence algorithms. For example, a chatbot dialog may include a conversation between a user and an automated bot (e.g., a chatbot) including text, audio, video, images, and/or the like. In non-limiting embodiments, a chatbot dialog may be conducted through a dialog window, through a primary chatbot interface, and/or the like. As used herein, the term "dialog window" refers to a GUI or portion of a GUI displayed on a user device that includes a chatbot dialog. A dialog window may include input options for the user and a display of responses from the automated system. In non-limiting embodiments, the chatbot may be driven by a language model, such as a Large Language Model (LLM), Small Language Model (SML), and/or text diffusion model, as examples, configured to engage in a conversational dialog with a user through queries (e.g., prompts, commands, requests, questions, and/or the like) input by the user.

Non-limiting embodiments of the systems and methods described herein provide for dynamic context to be provided to new chatbot interactions, allowing for chatbot interactions to have context from historic chatbot interactions in a single thread rather than potentially irrelevant context from recent interactions. As used herein, the term "single thread messaging" refers to an isolated message-based chatbot dialog that exists independent of and separate from a general and/or primary message-based chatbot dialog. For example, a single thread of messages may include a chatbot dialog that does not necessarily use the immediately preceding chatbot dialog as context and is therefore not influenced by previous threads of messages.

Non-limiting embodiments of the systems and methods described herein manage the limited-size context window of a machine-learning model to preserve computational resources, avoid duplicative processing and inferences, and increase the accuracy of the responsive output with respect to the intention and goal of the user. Further, by providing dual chatbot interfaces, non-limiting embodiments described herein allow for users to initiate a new chatbot interaction quickly and efficiently without disrupting an ongoing chatbot interaction in a primary chatbot window and/or without leaving another GUI being interacted with. By providing a floating chatbot dialog in response to a shortcut action, non-limiting embodiments provide streamlined access to machine-learning tools without requiring a user to open a primary chatbot interface through a browser or desktop application and navigate away from a current task. Further benefits and improvements will be apparent to those skilled in the art.

Referring now to FIG. 1, a system 1000 for single thread messaging using episodic memory is shown according to non-limiting embodiments. The system 1000 includes a computing device 100 configured to execute one or more software applications. The computing device 100 may be a server computer, for example, providing software-based services to user devices, such as user computing device 102, via one or more networks. It will be appreciated that the computing device 100 may also be used locally, such that the user computing device 102 is local to and/or includes computing device 100. Various other arrangements are possible. The user computing device 102 may display a GUI 110 that facilitates user interaction with the user computing device 102 and, through the user computing device, the computing device 100. The GUI 110 may include a dialog window displayed on top of a primary GUI window, such as a desktop, word processing application, coding environment, primary chatbot interface, and/or the like.

With continued reference to FIG. 1, the computing device 100 may be in communication with one or more machine-learning models 114. In non-limiting embodiments, the machine-learning models 114 may include one or more language models (e.g., LLMs, SLMs, text diffusion models, and/or the like). In non-limiting embodiments, the machine-learning models 114 may include generative models, including language models, image models, audio models, and/or the like. In non-limiting embodiments, the machine-learning models 114 may be local to and hosted by computing device 100. In non-limiting embodiments, the machine-learning models 114 may be hosted by a remote server computer (not shown in FIG. 1) remote from computing device 100 and provided as a service over one or more networks to computer device 100, which in turn provides services to user computing device 102.

Still referring to FIG. 1, a user may interact with the GUI 110 and/or user computing device 102 to communicate a user query 112 to computing device 100. In non-limiting embodiments, the user query 112 may be input into a dialog window that is displayed on top of a main desktop GUI. For example, the dialog window may be superimposed on top of a primary chatbot interface (e.g., a multi-threaded conversation with an artificial intelligence chatbot) and/or any other GUI, such as a workspace desktop, browser, word processing application, coding environment, and/or the like. In some examples, the dialog window may be automatically displayed in response to a shortcut action, such as a keyboard, mouse, and/or touchscreen input. In non-limiting embodiments, queries input into the dialog window may be processed differently than queries input into a primary chatbot interface. For example, token limits may be lower for queries and responses in the dialog window relative to queries and responses in a primary chatbot interface.

In non-limiting embodiments, the computing device 100 may generate a response 120 to the user query 112 and communicate the response to the user computing device 102. For example, the response 120 may be generated by generating an inference request 166 and inputting the inference request 116 to a machine-learning model 114 to receive an output 118. In non-limiting embodiments, the computing device 100 may pass the user query 112 to the machine-learning model 114 as the inference request 116 or may generate an inference request 116 based on the user query 112 without including the full user query 112. In non-limiting embodiments, the computing device 100 may pass the output 118 to the user computing device 102 as the response 120 or may generate a response 120 based on the output 118. A chatbot interaction may continue between the user computing device 102 and the computing device 100 with additional user queries (e.g., query 122) and responses (e.g., response 124).

With continued reference to FIG. 1, in non-limiting embodiments, each next user query (e.g., query 122) may be processed by the computing device 100 to determine if a current chatbot episode has ended. As used herein, the term "chatbot episode" refers to an interaction of related queries and responses (e.g., messages during a chatbot dialog) between a user (e.g., a user of user computing device 102) and an automated chatbot. For example, a chatbot episode may include a dialog between a user and a language model (e.g., machine-learning model 114) and/or software agent that interfaces with a machine-learning model 114. In non-limiting embodiments, a chatbot episode may include messages related by domain (e.g., topic, category, and/or the like) and/or task (e.g., a problem to be solved or outcome of a solution). It will be appreciated that any property of chatbot messages may be a basis for associating the messages together as a chatbot episode. In non-limiting embodiments, messages may be associated with a chatbot episode based on a similarity of a user query and/or response to other messages in an episode. For example, a query 122 may be converted into an embedding and the embedding may be compared to embeddings for other messages (and/or summaries of messages) in a current episode (e.g., for previous queries and/or responses). In response to a next query (e.g., query 122) being dissimilar to the current chatbot episode, the chatbot episode may be determined to be ended. For example, embeddings may be compared to determine if the distance between the embeddings satisfies a threshold. A distance that satisfies a threshold may be determined to be dissimilar for ending the episode.

With continued reference to FIG. 1, computing device 100 may be in communication with a data storage device having episodic memory 104 stored therein. When a chatbot episode has ended, the messages for that chatbot episode 106 (e.g., the queries and responses preceding the ending of the chatbot episode) may be stored as episodic memory 104. As used herein, the term "episodic memory" refers to stored, structured data that is logically separated by individual chatbot episodes 106. For example, an episode of episodic memory may include messages, parameters, and metadata for a chatbot episode in an isolated container (e.g., data structure). The individual chatbot episodes 106 may be identified by a unique episode identifier (e.g., "episode 1" or the like). In non-limiting embodiments, the chatbot episodes 106 may be separate data structures or separate entries (e.g., rows, columns, tables, and/or the like) of a larger data structure with multiple chatbot episodes stored therein. In non-limiting embodiments, storing the messages as episodic memory 104 may include converting the messages to embeddings by inputting the messages into one or more embedding models and/or embedding layers of a model. In non-limiting embodiments, storing the messages as episodic memory may include generating one or more summaries and/or tags for the messages and storing the summaries and/or tags as plaintext and/or as embeddings. For example, the messages may be input into a language model (e.g., machine-learning model 114 or another model) to generate one or more summaries (e.g., a general summary, a solution summary, an outcome summary, a lessons summary, and/or the like) and/or one or more tags (e.g., keywords or short textual identifiers).

Still referring to FIG. 1, after determining that a current chatbot episode has ended, the computing device 100 may initiate a new chatbot episode with the user query that triggered the end of the previous chatbot episode (e.g., query 122). In response to initiating a new chatbot episode, the computing device 100 may search the episodic memory 104 based on the user query 122 to identify one or more episodes that are similar to the user query. For example, embeddings of summaries and/or messages of each episode may be compared to an embedding of the user query to determine if the distance between the embeddings satisfies a threshold. Such a comparison may consider the semantic similarity between the query and the other messages and/or summary. In response to identifying one or more episodes that satisfy a similarity threshold (e.g., distance threshold), the computing device 100 may extract the messages and/or metadata (e.g., summaries, tags, and/or the like) from those one or more episodes. The messages and/or metadata may be extracted by copying them to temporary memory, such as GPU memory associated with the machine-learning model 114, as an example.

With continued reference to FIG. 1, the computing device may generate a response (e.g., response 124) based on the user query (e.g., user query 122) and the extracted messages and/or metadata. For example, the extracted messages and/or metadata may be input into a context window of an inference request made to the machine-learning model 114 based on the user query. The inference request may include, for example, a system prompt, a user query, extracted messages, and extracted metadata associated with the extracted messages. The chatbot episode may continue with this context, providing the user of user computing device 102 with accurate responses that consider previous interactions from one or more prior chatbot episodes.

In non-limiting embodiments, the system 1000 may manage limitations on the number of tokens that are input to the machine-learning model 114 as context. For example, the system 1000 may manage a token budget that is divided between messages and metadata (e.g., tags and/or summaries, such as a situation summary, outcome summary, and/or lessons summary) for the chatbot episode. In some non-limiting embodiments, messages or a combination of messages and metadata may be used to limit the amount of tokens. In some non-limiting embodiments, only metadata context may be used. In some non-limiting embodiments, multiple tiers of context (e.g., different ratios and/or combinations of messages and metadata) may be considered for each separate chatbot episode, such that some chatbot episodes may include more metadata context than others.

Figure 2:
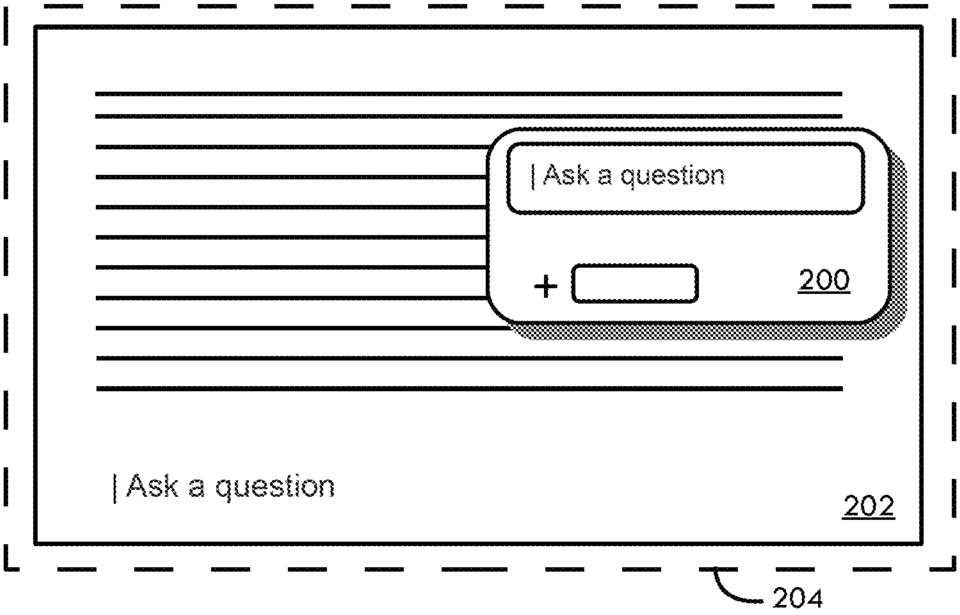
FIG. 2 illustrates a graphical user interface (GUI) for a system for single thread messaging using episodic memory according to non-limiting embodiments or aspects.

Referring to FIG. 2, a GUI 204 for single thread messaging using episodic memory is shown according to non-limiting embodiments. The GUI 204 may be rendered on a display device of a user computer device and include a primary window 202, such as a desktop, browser, word processing application, coding environment, and/or the like. In some examples, the primary window 202 may include a primary chatbot interface that includes a continuous and/or multi-threaded chatbot interaction. A dialog window 200 may be displayed on top of the primary window 202 in response to an action (e.g., such as a shortcut action). The dialog window 200 may include a chatbot episode that is separate from a chatbot interaction in the primary window 202. In some examples, the same service and/or machine-learning model (e.g., computing device 100 and machine-learning model 114 in FIG. 1) may be used for both the primary window 202 chatbot interactions and the dialog window 200 chatbot interactions. In non-limiting embodiments, the messages from the dialog window 200 chatbot interactions do not appear in the primary window 202. In non-limiting embodiments, the dialog window 200 may float on top of the primary window 202 as a pop-up window. In non-limiting embodiments, the dialog window 200 may have fewer input options and/or visual elements (e.g., buttons, input boxes, icons, tools, and/or the like) than a primary chatbot window to result in a streamlined dialog window 200 that can be superimposed on the primary window 202 without distraction.

With continued reference to FIG. 2, the dialog window 200 may be presented along the top, bottom, or side of the GUI 204, or may be displayed floating in the center as in FIG. 2. In non-limiting embodiments, the dialog window 200 may include a transparent or semi-transparent background so that the primary window 202 can be at least partially seen through the dialog window 200. In non-limiting embodiments, the dialog window 200 may be dragged, moved, resized, minimized, and/or the like. In some non-limiting embodiments, the dialog window 200 may be manually closed to end a chatbot episode.

Figure 3A:
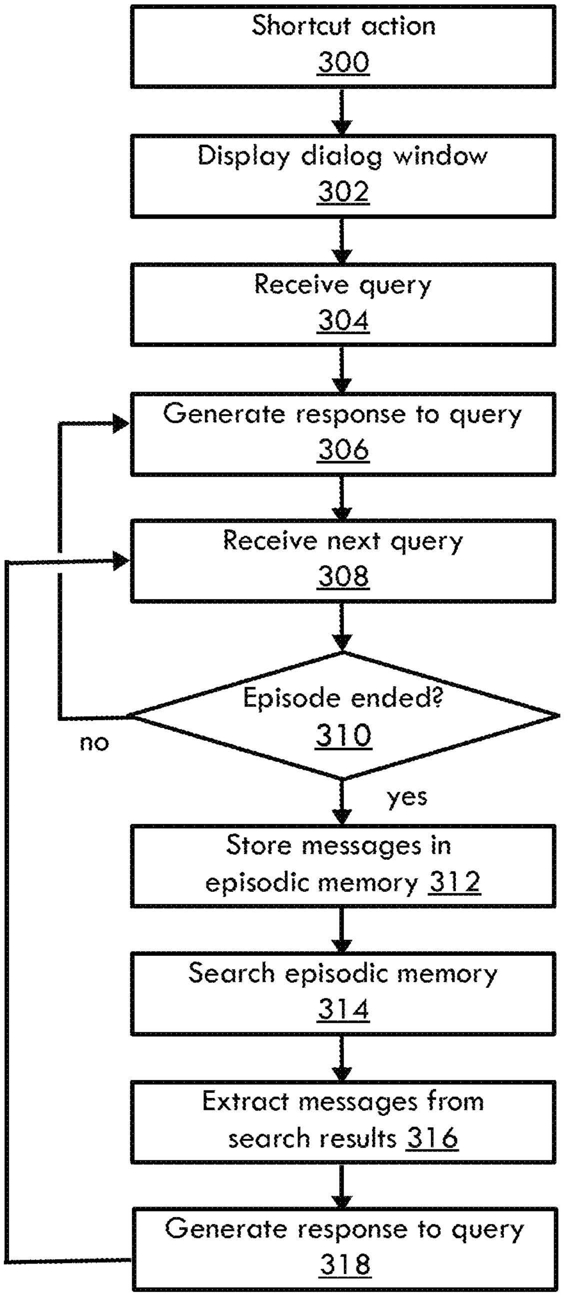
FIG. 3A illustrates a flow diagram for a method for single thread messaging using episodic memory according to non-limiting embodiments or aspects.

Referring now to FIG. 3A, a flow chart is shown for single thread messaging using episodic memory according to non-limiting embodiments. The steps shown in FIG. 3A are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 3A may be performed by one or more computing devices, such as computing device 100 shown in FIG. 1.

At step 300, a shortcut action is detected. A shortcut action may include a keyboard shortcut (e.g., combination of keys) or any other action (e.g., a gesture of mouse movement or touchscreen interaction, etc.). In response to the shortcut action, a dialog window may be displayed at step 302 on top of a current GUI being viewed. For example, a dialog window as shown in FIG. 2 may be displayed in response to the shortcut action. At step 304, a query may be received from a user. A query may ask a question, request an output, and/or the like. At step 306, a response to the query may be generated. The response may be generated by inputting an inference request into a machine-learning model and receiving an output. The query from step 304 may be input to the machine-learning model as the inference request or an inference request may be generated based on the user query without including the full user query, as an example. At step 306, the output may be provided to the user as the response or may be used to generate a response (e.g., by modifying the output and/or the like).

With continued reference to FIG. 3A, a next query may be received through the dialog window at step 308. At step 310, it may be determined whether a current chatbot episode has ended. For example, at step 310 the user query received at step 308 may be compared to previous messages from the current chatbot episode (e.g., such as the query and response from steps 304 and 306). In non-limiting embodiments, the comparison is performed by converting the query received at step 308 into an embedding and comparing the embedding to embeddings for previous messages and/or metadata (e.g., summaries, tags, and/or the like) in the chatbot episode to determine a similarity of the query to messages in the current chatbot episode. In response to the query being dissimilar to the current chatbot episode, the chatbot episode may be determined to have ended. For example, embeddings may be compared to determine if the distance between an embedding for the next query and prior messages and/or metadata satisfies a threshold. The threshold may be a predefined threshold value in non-limiting embodiments. If the chatbot episode has not ended, the method may repeat steps 306, 308, and 310 to continue the chatbot episode. These steps may repeat one or more times until the chatbot episode has ended at step 310.

Once the chatbot episode has ended at step 310, the method may proceed to step 312 and the messages for the chatbot episode that was ended may be stored in episodic memory. For example, the messages (e.g., queries and responses) for the ended chatbot episode may be stored in relation to a unique episode identifier and/or in a separate data structure. In non-limiting embodiments, storing the messages in episodic memory may include converting the messages to embeddings and storing the embeddings as episodic memory. In non-limiting embodiments, the messages may be stored as plaintext in episodic memory. In non-limiting embodiments, the messages may be used to generate one or more summaries and/or tags that are stored in episodic memory as metadata. For example, one or more of the messages of a chatbot episode may be input into a machine-learning model to generate a summary of the chatbot episode and/or tags representing the chatbot episode, and the summary and/or tags may be stored in episodic memory as an embedding and/or plaintext. In non-limiting embodiments, messages may be clustered into episodes with one or more clustering algorithms. In non-limiting embodiments, the episodic memory for a chatbot episode may be stored in real-time with the interaction (e.g., during the chatbot dialog as the messages are provided).

In non-limiting embodiments, the episodic memory for a chatbot episode may include a title, an original message (e.g., an initial query or response), other messages (e.g., related queries and/or responses from the same conversation), metadata (e.g., summaries, tags, timestamps, linked applications, user actions during the episode, and/or the like). In non-limiting embodiments, the summary for a chatbot episode may be generated in multiple parts. For example, a summary may be generated with a situation summary, an outcomes summary, and/or a lessons summary to facilitate reuse of the episode. The situation summary may provide a summary of the user queries and/or intentions. The lessons summary may provide patterns and/or user preferences from the chatbot episode, such as user preference of output formats, user preference of acknowledgements of concerns, as well as user technical experience, expected inputs and/or formatting from the user, and/or other user traits and/or preferences. In non-limiting embodiments, the episodic memory for a chatbot episode may include one or more tags. The tags may be generated by inputting the summary and/or messages of the episode into a machine-learning model to return a predetermined number of tags that represent the episode. Tags may include keywords and/or hyphenated phrases and may be identified from a list of tags or may be uniquely generated by a machine-learning model.

Still referring to FIG. 3A, at step 314 the episodic memory may be searched based on the query that triggered the ending of the chatbot episode. For example, in response to the episode ending, the query received at step 308 that triggered the end of the chatbot episode at step 310 may be converted to an embedding and the embedding may be used to search the episodic memory to find one or more matching chatbot episodes. In some non-limiting embodiments, embeddings of summaries of each episode may be compared to the user query to determine if the distance between the embeddings satisfies a threshold. In some non-limiting embodiments, embeddings of the messages may be used for comparison. In some non-limiting embodiments, a temporal weight may be applied to the searched episodes based on timestamps such that more recent episodes are given more relevancy than older episodes.

In response to identifying one or more episodes, the method may proceed to step 316 to extract the messages and/or metadata from the episode. For example, at step 316 one or more episodes that most closely match (e.g., have the shortest distance from) the query may be retrieved from memory and the messages and/or metadata extracted. The messages and/or metadata may be extracted by retrieving plaintext messages and/or embeddings stored in relation to the searched embeddings (e.g., the embeddings for the summaries, for example) and storing the extracted information in temporary memory. At step 318, a response to the first query for the new chatbot episode may be generated as described in connection with step 306. For example, the extracted messages and/or metadata may be input into a context window of an inference request to a machine-learning model. The method may then return to step 308 to continue the chatbot episode until it ends at step 310.

Figure 3B:
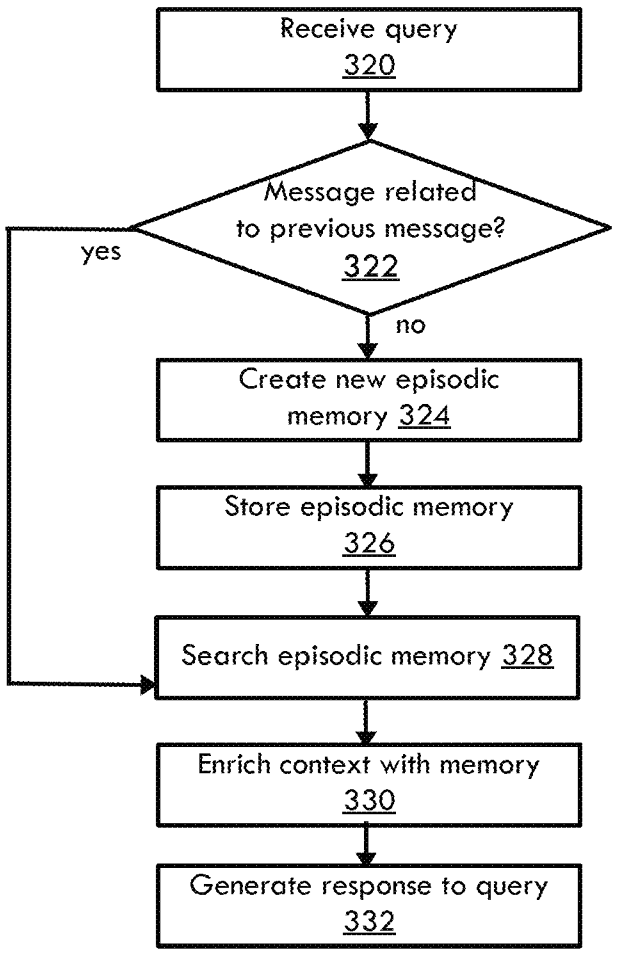
FIG. 3B illustrates a further flow diagram for a method for single thread messaging using episodic memory according to non-limiting embodiments or aspects.

Referring now to FIG. 3B, a flow chart is shown for single thread messaging using episodic memory according to non-limiting embodiments. The steps shown in FIG. 3B are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 3B may be performed by one or more computing devices, such as computing device 100 shown in FIG. 1.

At step 320, a query may be received from a user. A query may ask a question, request an output, and/or the like. At step 322, it may be determined whether a message (e.g., the query from the user) is related to a previously received message (e.g., a previous query and/or previous response generated in response to the previous query). In non-limiting embodiments, the comparison may be performed by converting the message(s) into one or more embeddings and comparing the embeddings to embeddings for previous messages and/or metadata (e.g., summaries, tags, and/or the like) to determine a similarity. If the message is not related (e.g., similar within a threshold), the method may continue to step 324 and a new episodic memory may be created for the prior messages (e.g., the prior dialog of a chatbot episode). In non-limiting embodiments, the episodic memory for a chatbot episode may include a title, an original message (e.g., an initial query or response), other messages (e.g., related queries and/or responses from the same conversation), metadata (e.g., summaries, tags, timestamps, linked applications, user actions during the episode, and/or the like).

If the message is determined to be related at step 322, the method may proceed to step 328 in some non-limiting embodiments to identify additional context for the ongoing chatbot episode. If the message is not related at step 322, step 328 may be performed to identify context for a new chatbot episode. At step 328, the episodic memory may be searched to identify one or more episodes related to the message(s). For example, the episodic memory may be searched based on the query and/or response analyzed at step 322. At step 330, the episodic memory identified during the search may be used to enrich context data for an inference request to a machine-learning model to determine a response to the user query (e.g., the query received at step 320). At step 332, the response is generated by the machine-learning model based on the enriched context.

Referring now to FIGS. 4-6, shown are examples of information that may be stored as episodic memory in non-limiting embodiments. The information may include tags that include categories and/or keywords to identify the content of the episode. The tags may be stored in episodic memory as embeddings and/or plaintext to facilitate a search of the episodic memory. As shown in FIG. 4, tags for a chatbot episode involving drafting and/or editing a job application or cover letter for a software engineering job may include, for example, job-application, email-writing, software-engineering, ai-artificial-intelligence, machine-learning, career-development, tech-industry, and professional-communication. The chatbot episode shown in FIG. 4 also includes a situation summary that summarizes the user's objective to draft a professional email to apply for a job. The lessons summary includes user parameters inferred from the chatbot episode, including user preferences for output formats, user background information, and the like. The chatbot episode shown in FIG. 4 also includes an outcome summary that summarizes the result of the chatbot episode and what was provided to the user.

FIG. 5 shows a chatbot episode involving JavaScript programming. The tags include JavaScript, debugging, function-refactoring, code-review, pricing-calculation, discount-logic, programming-best-practices, and variable-naming, suggesting the topic and aspects of the user queries. The chatbot episode shown in FIG. 5 also includes a situation summary that summarizes the user's objective to debug a function for calculating discounted prices that was providing an infinite return, and the user's desire to improve the code with descriptive variable names. The lessons summary includes user parameters inferred from the chatbot episode, including user preferences for variable names and responses, and the format of information the user provided in the episode. The chatbot episode shown in FIG. 5 also includes an outcome summary that summarizes the result of the chatbot episode and that a technical fix was provided as an outcome.

FIG. 6 shows a chatbot episode involving programming and developing a customer relationship management (CRM) program. The tags include crm-development, nextjs, typescript, web-development, project-planning, software-architecture, database-design, and fullstack-development. The chatbot episode shown in FIG. 6 also includes a situation summary that summarizes the user's objective to build a CRM platform using Next.js and TypeScript. The lessons summary includes user parameters inferred from the chatbot episode, including user preferences for frameworks (next.js), programming languages, and a structured, step-based approach. The chatbot episode shown in FIG. 6 also includes an outcome summary that summarizes the result of the chatbot episode as providing guidance to start the project but with no indication that the project was initiated due to a lack of follow-up queries.

Figure 7:
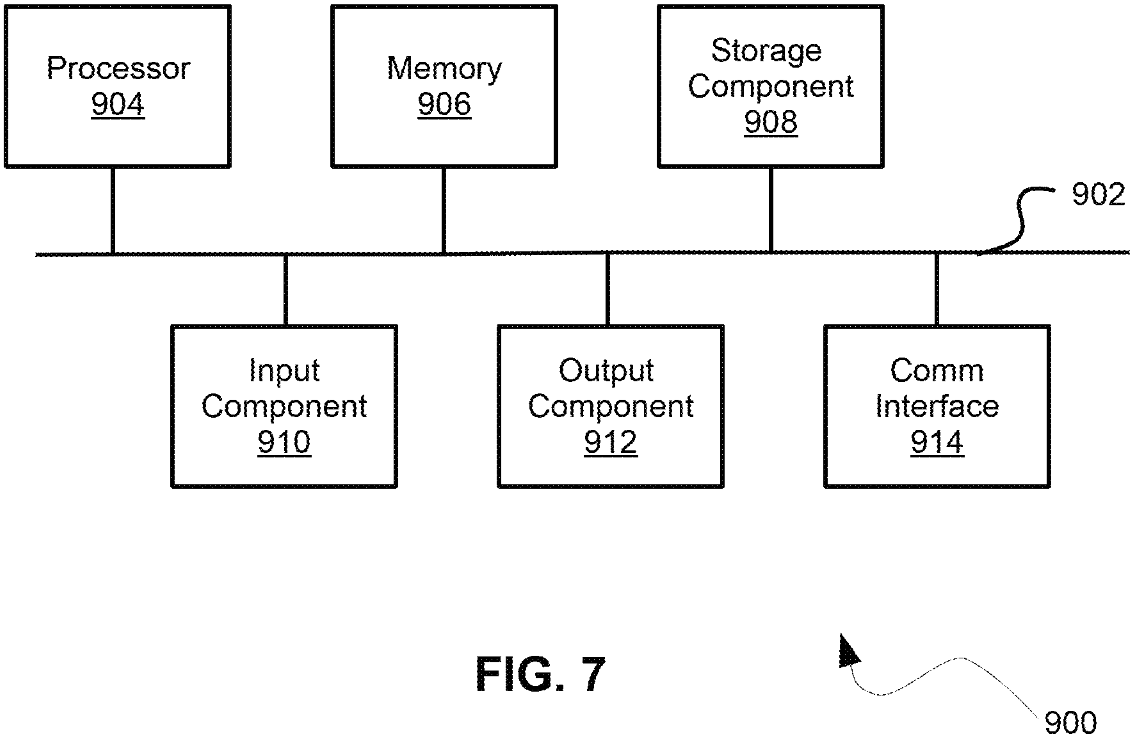
FIG. 7 illustrates example components of a device used in connection with non-limiting embodiments or aspects of systems, methods, and computer program products for single thread messaging using episodic memory.

Referring now to FIG. 7, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 7. Device 900 may correspond to the computing device 100 shown in FIG. 1. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method comprising:

generating, with at least one computing device and a machine-learning model, at least one response to at least one user query input into a dialog window displayed on a user device;

determining, with at least one computing device, a chatbot episode has ended based on a new user query input into the dialog window, the chatbot episode comprising a plurality of messages including the at least one response and the at least one user query;

storing, with at least one computing device, the plurality of messages and associated metadata in episodic memory for the chatbot episode;

searching, with at least one computing device and based on the new user query, episodic memory for a plurality of previous chatbot episodes to identify at least one previous chatbot episode;

extracting, with at least one computing device and from the at least one previous chatbot episode, a combination of messages from the plurality of messages and metadata from the associated metadata based on a token budget and a token length of the messages and the metadata; and generating, with the machine-learning model, a response to the new user query based on inputting the extracted messages and metadata into a context window of the machine-learning model.

2. The method of claim 1, wherein the dialog window is independent of a primary chat dialog interface configured to conduct an automated chatbot dialog with the user with the machine-learning model, and wherein the plurality of messages does not appear in the primary chat dialog interface.

3. The method of claim 1, wherein determining the chatbot episode has ended comprises:

determining a distance between the new user query and at least one message of the plurality of messages based on comparing the new user query to the at least one message; and determining the distance satisfies a threshold, wherein the chatbot episode is determined to have ended in response to the distance satisfying the threshold.

4. The method of claim 1, further comprising:

generating, with at least one computing device, a summary of the chatbot episode based on the plurality of messages, wherein the summary is stored with the episodic memory for the chatbot episode.

5. The method of claim 4, further comprising:

generating at least one embedding based on at least one of the summary and the plurality of messages, wherein the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode.

6. The method of claim 5, wherein the at least one previous chatbot episode is identified in response to determining that a distance between the at least one embedding and the embedding of the summary for the at least one previous chatbot episode satisfies a threshold.

7. The method of claim 4, wherein generating the summary comprises inputting at least a portion of the plurality of messages into a language model.

8. The method of claim 1, further comprising:

generating at least one tag for the chatbot episode, wherein the at least one tag is stored with the episodic memory for the chatbot episode.

9. The method of claim 1, further comprising:

automatically displaying the dialog window on a current desktop of the user device in response to a user shortcut action.

10. A system comprising:

at least one server computer comprising at least one processor, the at least one server computer configured to:

generate with a machine-learning model, at least one response to at least one user query input into a dialog window displayed on a user device;

determine a chatbot episode has ended based on a new user query input into the dialog window, the chatbot episode comprising a plurality of messages including the at least one response and the at least one user query;

store the plurality of messages and associated metadata in episodic memory for the chatbot episode;

search episodic memory for a plurality of previous chatbot episodes to identify at least one previous chatbot episode based on the new user query;

extract, from the at least one previous chatbot episode, a combination of messages from the plurality of messages and metadata from the associated metadata based on a token budget and a token length of the messages and the metadata; and generate, with the machine-learning model, a response to the new user query based on inputting the extracted messages and metadata into a context window of the machine-learning model.

11. The system of claim 10, wherein the dialog window is independent of a primary chat dialog interface configured to conduct an automated chatbot dialog with the user with the machine-learning model, and wherein the plurality of messages does not appear in the primary chat dialog interface.

12. The system of claim 10, wherein determining the chatbot episode has ended comprises:

determining a distance between the new user query and at least one message of the plurality of messages based on comparing the new user query to the at least one message; and determining the distance satisfies a threshold, wherein the chatbot episode is determined to have ended in response to the distance satisfying the threshold.

13. The system of claim 10, wherein the at least one server computer is further configured to:

generate a summary of the chatbot episode based on the plurality of messages, wherein the summary is stored with the episodic memory for the chatbot episode.

14. The system of claim 13, wherein the at least one server computer is further configured to:

generate at least one embedding based on at least one of the summary and the plurality of messages, wherein the at least one embedding is stored in the episodic memory for the chatbot episode, and wherein searching the episodic memory for a plurality of previous chatbot episodes to identify the at least one previous chatbot episode is based on comparing the at least one embedding to an embedding of a summary for the at least one previous chatbot episode.

15. The system of claim 14, wherein the at least one previous chatbot episode is identified in response to determining that a distance between the at least one embedding and the embedding of the summary for the at least one previous chatbot episode satisfies a threshold.

16. The system of claim 13, wherein generating the summary comprises inputting at least a portion of the plurality of messages into a language model.

17. The system of claim 10, wherein the at least one server computer is further configured to:

generate at least one tag for the chatbot episode, wherein the at least one tag is stored with the episodic memory for the chatbot episode.

18. The system of claim 10, wherein the at least one server computer is further configured to:

automatically display the dialog window on a current desktop of the user device in response to a user shortcut action.

19. A computer program product comprising at least one non-transitory computer-readable medium including program instructions that, when executed by at least one computing device, cause the at least one computing device to:

generate with a machine-learning model, at least one response to at least one user query input into a dialog window displayed on a user device;

determine a chatbot episode has ended based on a new user query input into the dialog window, the chatbot episode comprising a plurality of messages including the at least one response and the at least one user query;

store the plurality of messages and associated metadata in episodic memory for the chatbot episode;

search episodic memory for a plurality of previous chatbot episodes to identify at least one previous chatbot episode based on the new user query;

extract, from the at least one previous chatbot episode, a combination of messages from the plurality of messages and metadata from the associated metadata based on a token budget and a token length of the messages and the metadata; and generate, with the machine-learning model, a response to the new user query based on inputting the extracted messages and metadata into a context window of the machine-learning model.

20. The computer program product of claim 19, wherein the dialog window is independent of a primary chat dialog interface configured to conduct an automated chatbot dialog with the user with the machine-learning model, and wherein the plurality of messages does not appear in the primary chat dialog interface.

* * * * *